Aug. 1, 1939.　　A. OBERHOFFKEN　　2,167,673
MACHINE TOOL
Filed Jan. 13, 1936　　6 Sheets-Sheet 1

INVENTOR
Alexander Oberhoffken
By Parker, Carlson, Pitzner, Hubbard
ATTORNEYS

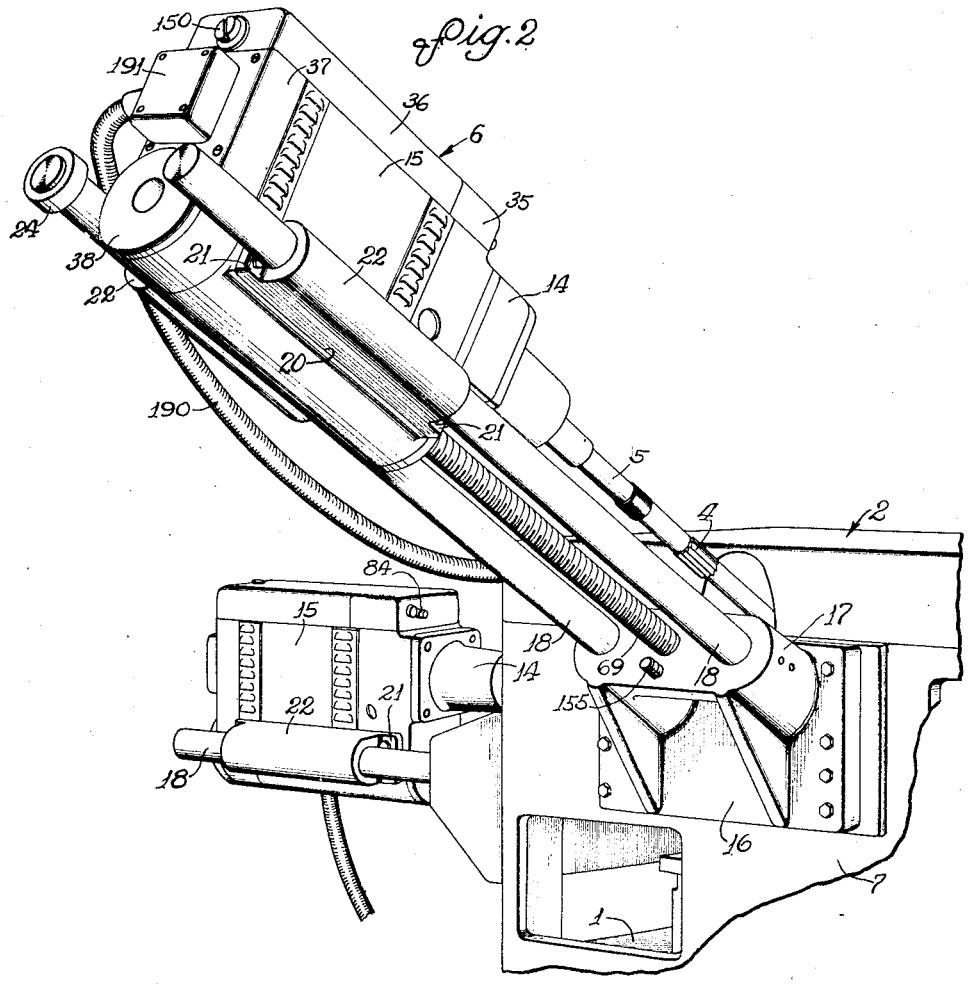

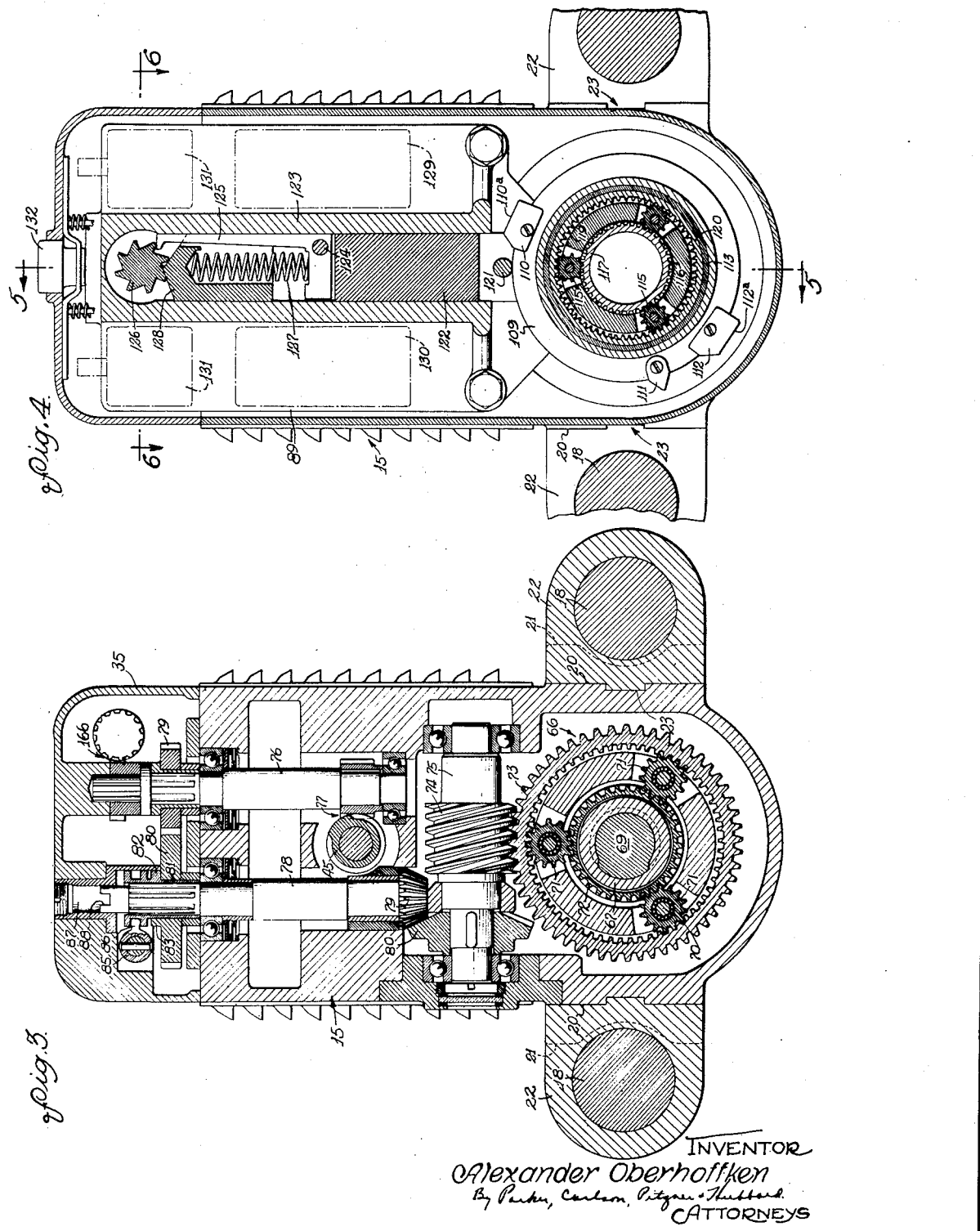

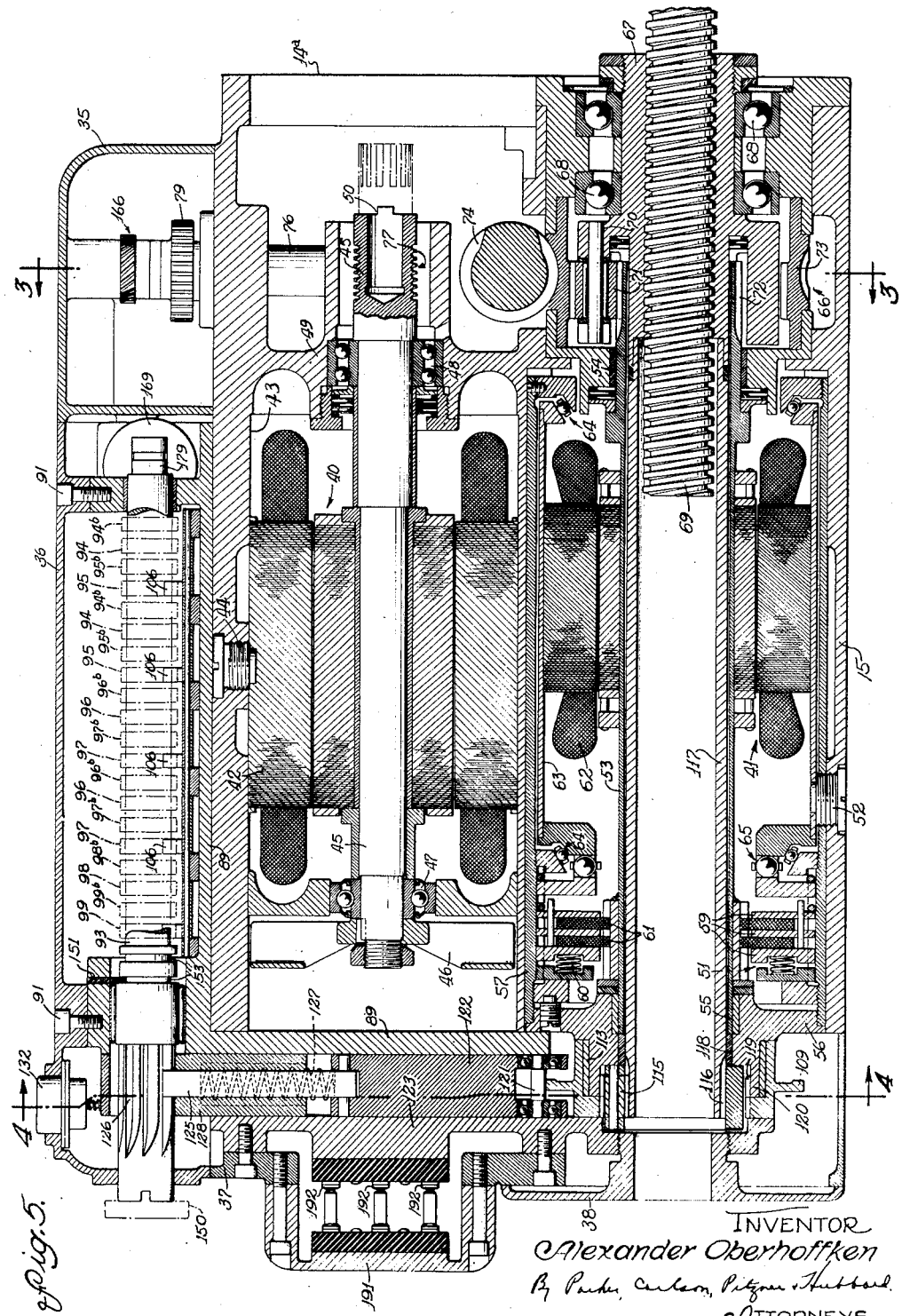

Aug. 1, 1939.  A. OBERHOFFKEN  2,167,673
MACHINE TOOL
Filed Jan. 13, 1936   6 Sheets-Sheet 5

INVENTOR
Alexander Oberhoffken
By Parker, Carlson, Pitzner & Hubbard
ATTORNEYS

Aug. 1, 1939.   A. OBERHOFFKEN   2,167,673
MACHINE TOOL
Filed Jan. 13, 1936   6 Sheets-Sheet 6

INVENTOR
Alexander Oberhoffken
By Parker, Carlson, Pitzner & Hubbard
ATTORNEYS

Patented Aug. 1, 1939

2,167,673

UNITED STATES PATENT OFFICE 2,167,673

MACHINE TOOL

Alexander Oberhoffken, Rockford, Ill., assignor to The Ingersoll Milling Machine Company, Rockford, Ill., a corporation of Illinois Application January 13, 1936, Serial No. 58,854

5 Claims. (Cl. 77—3)

This invention relates to general purpose machine tools for performing various metal-removing operations such as drilling, milling, tapping, boring, reaming, etc., and has more particular reference to the construction and mounting of a tool head for movement relative to a work piece to be machined.

The general object of the invention is to provide a new and improved machine tool which is less costly to manufacture than prior machines intended for the same general purposes, which may be adapted for the performance of several different kinds of metal-removing operations and which can be adapted readily and economically for operation on different parts of a work piece and at different lines of approach without necessitating costly changes in bed structure.

A more detailed object is to provide a machine tool having a slidable tool head demountably supported directly from the frame of the fixture in which the work piece is held while being operated upon.

Other objects and advantages of the invention will become apparent from the following detailed description taken in connection with the accompanying drawings, in which—

Fig. 2 is a fragmentary perspective view of a machine shown in Fig. 1.

Figure 1:
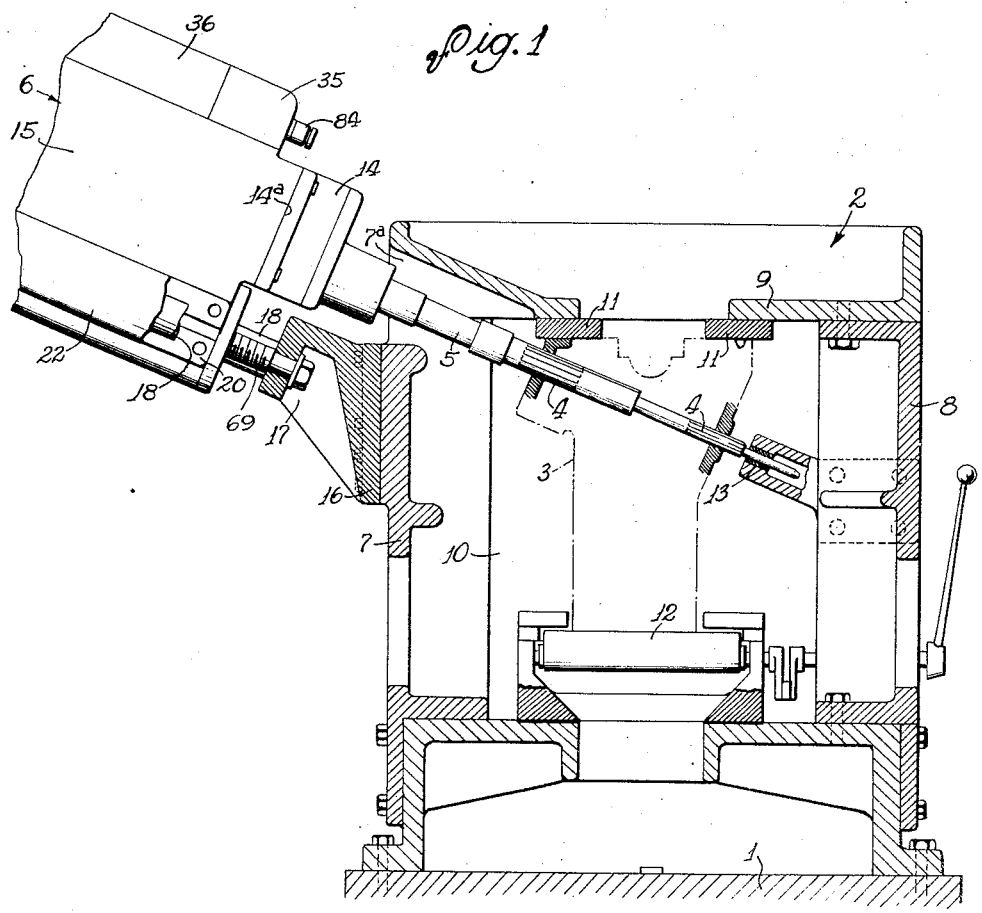
Figure 1 is a fragmentary vertical sectional view of a machine tool embodying the features of the present invention.

Figs. 3 and 4 are vertical transverse sectional views of the self-contained tool heads shown in Figs. 1, 2 and 4, the sections being taken respectively along the lines 3—3 and 4—4 of Fig. 5.

Figure 6:
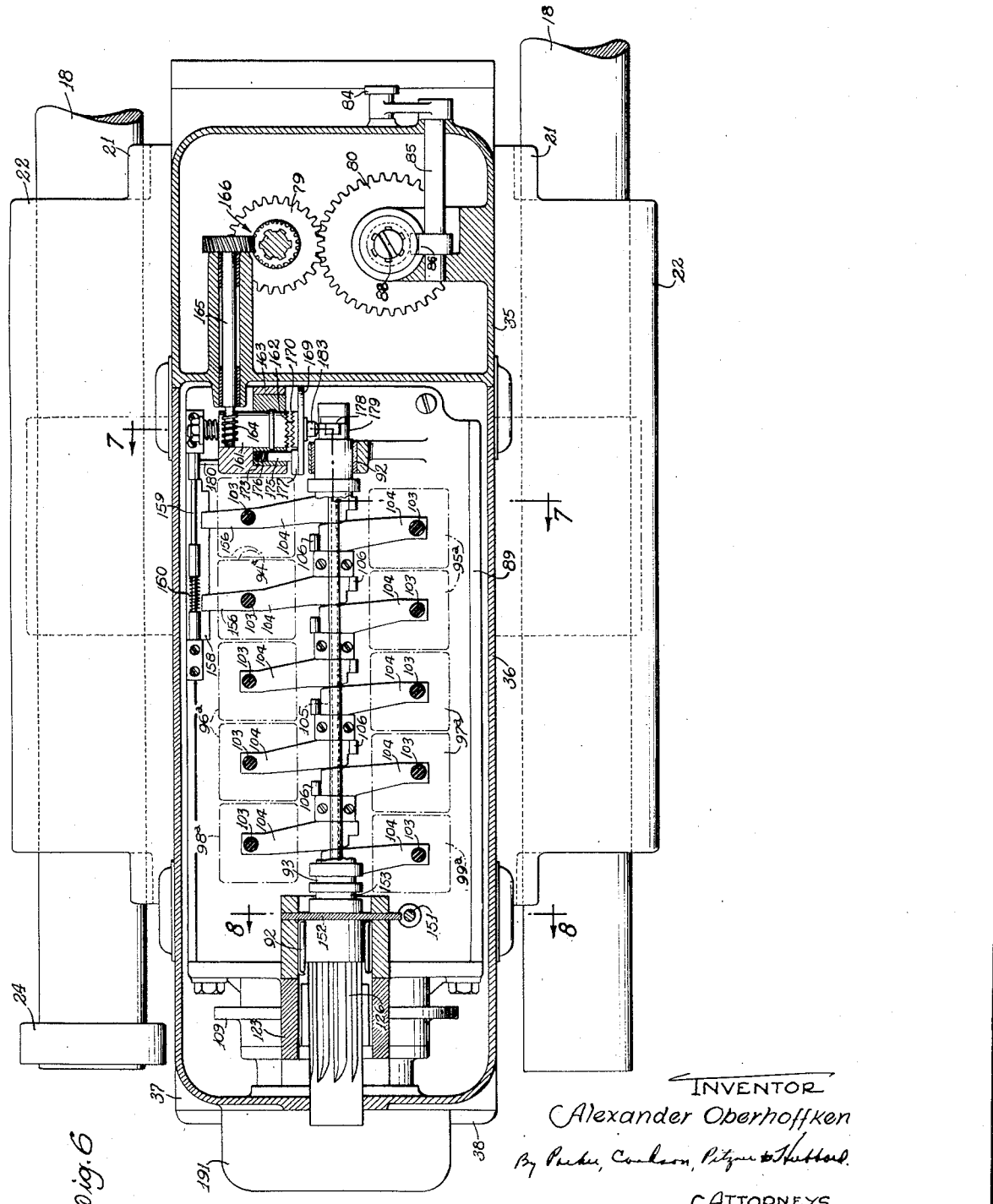

Figs. 5 and 6 are sectional views taken respectively along the lines 5—5 and 6—6 of Fig. 4.

Figure 7:
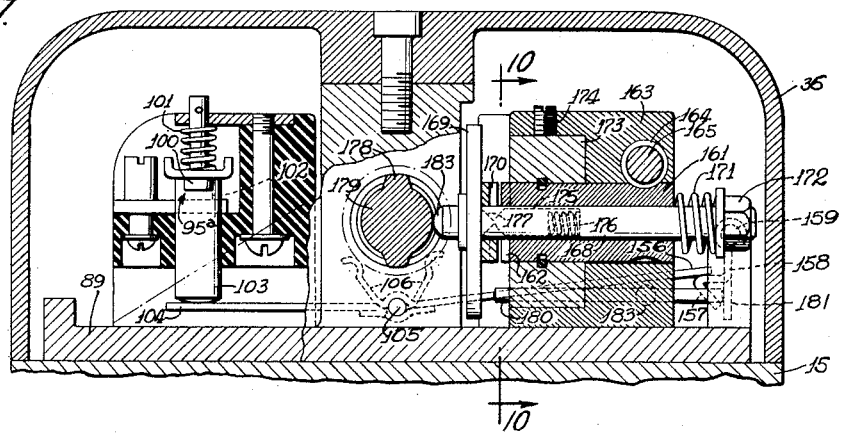
Figure 8:
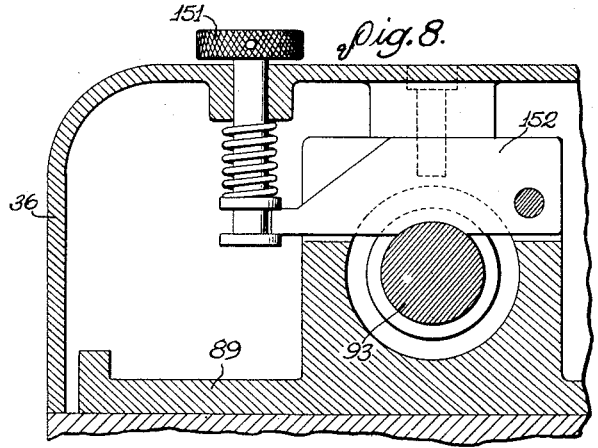

Figs. 7 and 8 are sectional views taken along the lines 7—7 and 8—8 of Fig. 6.

Figure 9:
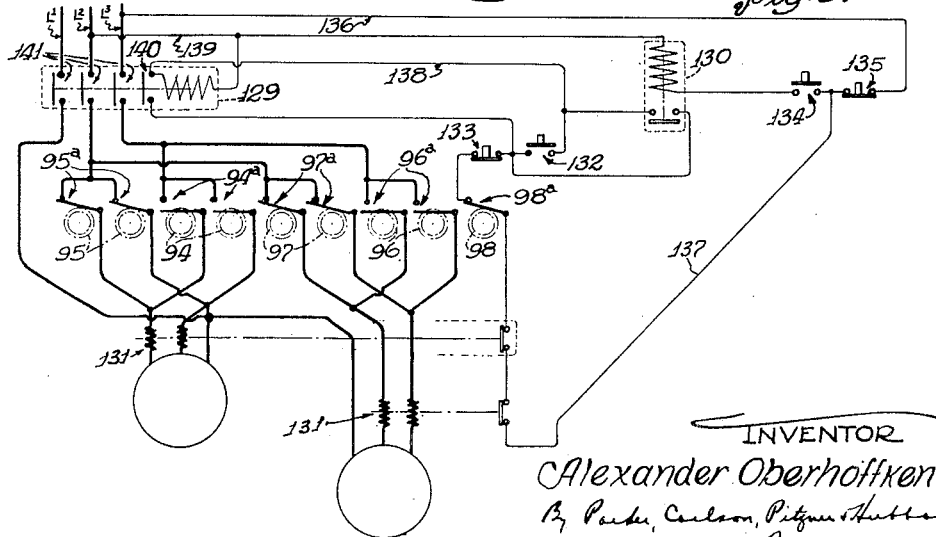

Fig. 9 is a schematic view and wiring diagram.

Figure 10:
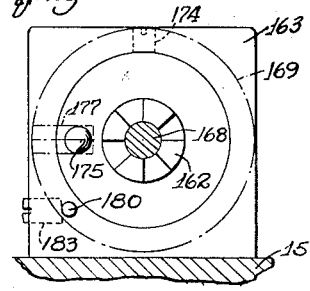

Fig. 10 is a sectional view taken along the line 10—10 of Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The machine tools shown in the drawings to illustrate the invention comprise generally a base or pedestal 1 upon which is supported a fixture 2 in which a work piece 3 may be held accurately in elevated working position above the floor while being operated upon by one or more tools 4 on a spindle 5 rotated and reciprocated axially by a self-contained power unit 6. The fixture frame is a rigid box-like structure removably secured as by screws to the base 1 and having upright side walls 7 and 8 rigidly joined at their upper ends by a top wall 9 and having an opening 10 through which the work piece may be slid into operating position in which it is pressed against locating plates 11 by the action of clamping cams 12. In the forms shown in Figs. 1 and 2, the tool spindle projects through an opening 7a and is guided at its projecting end in a bushing 13 on the fixture. The other end is journaled in a gear housing 14 detachably secured to an attachment surface 14a on the forward end wall of a box-like casing 15 of the power unit 6.

To avoid the necessity of providing the usual special bed mounting for the tool feeding and driving mechanism and to enable the line of approach of the tool to the work to be changed at minimum expense, the unit 6 is, in the present instance, supported solely from the fixture frame 2. For this purpose, a bracket 16 is detachably bolted to the side wall 7 and has a boss 17 which is apertured to receive the ends of spaced parallel rods 18 having machined external surfaces forming the guideways for the tool head. The rods are anchored in the boss 17 and project from the fixture at the angle necessary for defining the desired line of tool approach.

To support the head 6 from the rods 18, opposite side walls of the casing 15 are formed with attachment surfaces 20 to which are bolted flanges 21 of elongated tubular brackets 22 which are slidable on the rods 18 and have internal way surfaces mating properly with the guide surfaces on the rods. If desired, a tongue and groove connection 23 may be provided between the casing walls 19 and the brackets 22. The casing 15 is thus arranged to slide back and forth along the rods, and if desired may be removed as a unit simply by detaching the brackets 22. A stop collar 24 on one of the rods determines the limit position to which the head may be retracted.

With the mounting described above, it will be observed that the tool head is supported entirely from the fixture frame thereby avoiding the necessity of providing a special bed structure for supporting the tool head guides. While the head overhangs the point of attachment of the rods to the rigid fixture frame and is primarily supported by the latter through the medium of the rods, this does not detract from the accuracy of the guiding action to an objectionable degree, for in most instances tool guides, such as those indicated at 13 (Fig. 1), will be employed. Also, when the tool is in actual engagement with the work, the head will be disposed close to the supporting bracket 16. By thus mounting the tool head, the machine tool may be adapted readily and economically to changes in the design or character of the work piece to be operated upon. For example, to change the position or line of tool approach, it is merely necessary to change the position of the bracket 16 or construct a new bracket for supporting the bars 18 at the proper angle, no changes in the bed structure being required.

All of the machine tool functions which involve power driven or moving parts are performed including driving of the tools and effecting relative feed and rapid traverse motions in automatically defined cycles by mechanism housed within the casing 15 and arranged in a novel manner to obtain a high degree of compactness and to enable the different groups of operating parts to be removed as individual units for purposes of repair. To this latter end, the casing comprises a central casting, front and rear top cover plates 35 and 36, and a rear cover 37 having an end plate 38 thereon.

Power for driving the tool spindle and for moving the head in both directions at feed and rapid traverse rates is derived from a combined feed and tool driving motor 40 (Fig. 5) and a rapid traverse motor 41. The stator 42 of the feed motor is received in a cylindrical recess 43 within the casing 15 and may be removed therefrom after removal of the rear cover 37 and a set screw 44 by which the stator is held in place. The rear end of the motor shaft 45 carries a fan 46 for inducing air circulation laterally through the casing and is journaled in bearings 47 and 48. The forward end of the shaft projects through a wall 49 and carries an element 50 of a coupling for extending the motor drive to gearing within the box 14 for reducing the speed to the value at which the tool spindle 5 is to be driven.

The rapid traverse motor 41 is associated with a friction brake indicated generally at 51 and the two constitute a sub-assembly mounted within a cylindrical bore in the lower part of the casing 15 and removable as a unit therefrom after the rear cover 37 and other parts have been removed and a set screw 52 loosened. To provide for a high degree of compactness of the operating parts within the casing 15, the motor shaft comprises a tube 53 journaled at its forward end in a bearing 54 and at its rear end in a bearing 55 in a plug 56 which threads into the rear end of a tube 57 received in a rearwardly opening recess in the casing 15. The brake comprises nonrotatable disks 59 splined within the tube 57 and normally urged by springs 60 into gripping engagement with rotatable disks 61 carried by the rotor shaft 53. The stator 62 of the motor is carried by a tube 63 supported by bearings 64 for a limited degree of angular movement within the tube 57 under the reaction exerted by the load on the motor when the latter is started. In this movement, the brake is released against the action of the springs by a cam mechanism 65.

Preferably, the rotary motions of the feed and rapid traverse motors are combined by differential gearing 66 and applied to a rotary feed element in the form of a nut 67 projecting through the forward end of the casing 15 and journaled in bearings 68. The nut threads onto a screw 69 suitably anchored at its forward end in the guide bracket 16. The screw or stationary feed element is thus attached rigidly to the fixture frame substantially in the plane of the axes of the rods 18 so as to minimize the tendency of the applied feeding force to flex the guide rods or alter the intended direction of feed of the tool head. Herein the differential gearing is of the planetary type positioned with its axis coincident with the motor shaft 53. Studs 70 carried by the nut support planet gears 71 meshing with the sun gear teeth 72 cut on the end of the rotor shaft 53 and with internal teeth on a ring gear 73 which also constitutes a worm wheel meshing with a worm 74 (Figs. 3 and 5) on a cross shaft 75 rotatably supported from opposite side walls of the casing 15.

Rotary power from the shaft 45 of the feed motor is communicated to the worm shaft 75 through a vertical shaft 76 (Fig. 3) connected at its lower end to the motor shaft by spiral gearing 77 and a second vertical shaft 78 carrying at its lower end a bevel pinion 79 which meshes with the bevel gear 80 fast on the worm shaft 75. The upper splined ends of the shaft 76 and 78 project into the casing cover 35 and carry intermeshing pick-off gears 79 and 80 which may be removed and changed as desired in order to obtain the desired feed rate.

The nut 67 may be rotated by either of the motors 40 and 41 causing the head 6 to be advanced along the screw 69 in a direction and at a speed corresponding to that of the operating motor. In the event that the feed motor 40 is operated simultaneously with the rapid traverse motor, the rate of motion of the head will be increased or decreased accordingly. When the feed motor alone is operating, the shaft of the rapid traverse motor is held against rotation by the brake 51 which is released automatically as an incident to starting of the rapid traverse motor.

To enable the head 6 to be advanced manually, the pick-off gear 80 is rotatable on a sleeve 81 splined on the shaft 78 and carrying a tooth 82 which, in the lower position of the sleeve shown in Fig. 7, enters a notch in the hub 83 of the gear thereby providing a driving connection between the shaft and the gear. By turning an external handle 84 (Fig. 6), a rock shaft 85 may be oscillated whereupon an arm 86 thereon engaging a collar on the upper end of the sleeve 81 will raise the latter to disconnect the shaft 78 and the gear 80. Thereafter, the shaft may be turned manually through the medium of a crank (not shown) inserted through an opening 87 in the cover 35 and engaging a coupling element 88 on the upper end of the shaft.

In the present instance, all of the switches, relays, overload devices, and the means for actuating the switches to control the selective operation of the motors 40 and 41 and thereby define automatic cycles of movements of the tool head, are incorporated in the unit 6 and movable therewith. The switching mechanism and its actuating means constitute a separate readily detachable sub-assembly carried beneath the top and rear covers 36 and 37 and including a frame 89 fitting on and fastened by screws to the casting 15. The cover 3 is secured to the sub-frame 89 by screws 91 (Fig. 5).

Rotatably supported in bearings 92 on the frame 89 is a cam shaft 93 having fast thereon pairs of cams 94, 95, 96, 97 and cams 98 and 99 respectively operating switches 94ᵃ to 99ᵃ which are arranged in staggered relation as shown in Fig. 6 on opposite sides of the cam shaft. Each switch comprises a pair of movable contacts 100 (Fig. 7) urged by a spring 101 into engagement with stationary contacts 102 and adapted to be moved to switch-open position by upward movement of an insulating pin 103 against the lower end of which bears a bell crank lever 104 pivoted at 105. An arm 106 of the lever constitutes the follower of one of the cams. The followers of the adjacent cams project in opposite directions as shown in Fig. 6.

The cam shaft is advanced unidirectionally with a step-by-step movement effected by a timing element comprising a disk 109 on the periphery of which the dogs 110, 111 and 112 are mounted for circumferential adjustment. The disk, which is rotatably supported by a bearing 113 on the projecting end of the plug 56 (Fig. 5), constitutes the ring gear of a planetary gearing having planet gears 115 meshing with the internal teeth of the ring gear and with teeth 116 cut on the rear end of a tubular shaft 117 encircling the screw 69. This shaft is coupled at its forward end to the rear end of the nut 67 for rotation therewith and at its rear end is journaled in a bearing 118.

The planet gears 115 also mesh with internal teeth 119 on a stationary flange 120 and of a number one less than the number on the disk 109. By virtue of this arrangement, the disk will rotate through a distance equal to the pitch of its teeth for each revolution of the nut 67. The dog disk thus turns in unison with the movements of the tool head but at slower speed than the nut. By employing the planetary speed reducing mechanism driven from the shaft extended through the rapid traverse motor shaft, the space required for the disk-driving parts is reduced to a minimum, and a maximum travel of the tool head may be obtained within one revolution of the dog disk.

The dogs operate as cams upon a follower roller 121 rotatably supported on the lower end of a plunger 122 slidable vertically in a guideway formed by the sub-frame 89 and a U-shaped plate 123 fastened thereto. Pivoted at 124 on the plunger is a pawl 125 engaging elongated teeth of a ratchet wheel 126 on the cam shaft 93. The pawl is urged toward the ratchet teeth by a spring 127 which also urges a detent 128 into engagement with the ratchet teeth so that the cam shaft 93 will, after being advanced a predetermined distance by the action of the pawl 125, be cammed quickly through the remainder of its step and there retained in fixed position by the detent 128. It is during this rapid advance of the cam shaft that the cams thereon operate to change the positions of the control switches.

From the foregoing, it will be seen that the cam shaft, the switches, the ratchet drive, and the dogs are accessible after removal of the covers 36, 37 and 38, and that the entire switch, cam shaft and ratchet assembly may be removed by detachment of the sub-frame 89 from the casing 15. The cover 37 also provides spaces on opposite sides of the ratchet pawl in which spaces, relays 129 and 130 are disposed (Figs. 4 and 9). Overload release devices 131 are housed within the rear end of the top cover 36 and disposed on opposite sides of the cam shaft 93. These may be reset by depressing a button 132 (Figs. 4 and 5) in the cover 36.

In the present instance, the cam actuated switches operate directly and at normal line voltage to control the starting, stopping and direction of rotation of the motors 40 and 41, the magnetic relay 129 serving to govern the flow of current from power lines $L_1$, $L_2$ and $L_3$ to the switches and having a winding controlled by start and stop push button switches 132 and 133 which may be mounted at a convenient point on the casing 15. The power lines extend through a flexible armor 190 into a terminal box 191 on the cover 37 within which the line terminals bear against contact terminals 192 leading to the control switches as shown in Fig. 9. The relay 130 is employed to enable several of the power units to be controlled in multiple from remotely located start and stop push button switches 134 and 135.

Assuming that the motor and control circuits are arranged as shown in Fig. 9, a cycle of rapid approach, feed and rapid return motions will be executed as follows in response to the closure of the start switch 132 with the parts positioned as shown in Fig. 13. Closure of this switch completes a circuit for energizing the winding of the relay 129 extending from the power line $L_3$ through a conductor 136, the closed switch 135, a conductor 137, the overload switch, the switch 98ᵃ which is held closed by the cam 98, the switches 133 and 132, a conductor 138, the winding of the relay, and a conductor 139 leading to the power line $L_2$. Energization of the relay closes a switch 140 in parallel with the manually operable switch 132 which thereafter may be allowed to open. Energization of the relay also closes switches 141 thereby applying current to the motors 40 and 41 through the switches 95ᵃ and 97ᵃ which, in the starting position of the tool head, are held closed by their cams 95 and 97. By the combined action of these motors, the head is advanced at a rapid traverse rate and the dog disk 109 rotated at a corresponding but slower speed.

When the dog 111 engages and actuates the follower 121, the cam shaft 93 is advanced one step whereupon the switches 95ᵃ are opened thereby interrupting the rapid approach motion, the forward movement of the tool head being continued at the feed rate by the motor 40. After the tools have operated upon the work, the dog 112 will actuate the ratchet pawl causing the cam shaft to be advanced through another step during the rapid movement of which the cams 94 will close the switches 94ᵃ thereby initiating rotation of the rapid traverse motor in a direction to retract the tool head. In the most advanced position of the tool head, the roller 121 engages the surface 112ᵃ so that the cam shaft is not advanced in the initial part of the rapid return motion. The condition of the switches is not changed as the dog 111 passes the follower 121 so that the rapid return motion continues until the dog 110 has actuated the ratchet mechanism to advance the cam shaft in its fourth and final step of movement during which the cam 98 opens the switch 98ᵃ momentarily thereby deenergizing the relay 129 and stopping both of the motors. In this same movement of the cam shaft, the switches 95ᵃ and 97ᵃ are closed by their cams to condition the circuits for the next cycle. When the movement of the tool head is arrested, the roller 121 is in engagement with the surface 110ᵃ on the dog 110. During any part of the cycling, the movement of the head may be interrupted by opening either of the stop switches 133 and 135. Thereafter the cycle may be continued by closing one of the switches 132 and 134.

To permit the control mechanism to be conditioned quickly and conveniently for the performance of other types of automatic cycles, such for example as that employed for tapping operations, the cam shaft 93 is equipped with one or more auxiliary sets of cams 94^b to 99^b which may be brought into operative association with the respective followers 104 by shifting the cam shaft axially through the medium of a knob 150 on the projecting end of the cam shaft. To release the cam shaft for such shifting, a knob 151 is actuated to withdraw a latch 152 out of a groove 153 in which the latch is seated to lock the cam shaft with the desired set of cams in operative association with the switch actuating followers 104.

The power unit described above is adapted for spot facing operations wherein the head is advanced against a positive stop where it dwells for a brief interval while the tool is performing the facing operation. The stop may take the form of an adjustable screw threading into the bracket 16 with its head positioned for engagement with the forward end of the tool head after the tool has advanced to the proper depth. When such engagement occurs, further rotation of the nut 67 is prevented, and the increased torque applied to the brake 51 by the feed motor acting through the differential gearing causes slippage of the brake and continued rotation of the tool spindle.

Mechanism is provided for timing the duration of the dwell period and automatically initiating rapid return of the tool head to starting position. This mechanism comprises generally means which is rendered operative automatically by the action of the dog 112 as the head approaches the stop 155 and which operates to latch the rapid return switches 94^a against closing at the normal time above described and permitting such closure after the lapse of an interval timed by the rotation of the feed motor 40.

Referring now to Figs. 5, 6 and 7, the followers 104 for the rapid return switch cams 94 are equipped with tails 156 which, when these followers are moved by their cams, are raised above a shoulder 157 on an elongated latch 158 pivoted at 159 on the frame 89 and urged toward the followers by a torsion spring 160. With their followers thus latched, closure of the switches 94^a after movement of the cam shaft 93 by the dog 112 is prevented thereby maintaining the rapid traverse motor deenergized as the feed motor continues to operate. The latch is arranged to be tripped by axial shifting of a rod 180 slidable in the block 163 and having one end positioned adjacent an arm 181 on the latch and the other end projecting from the block.

In the step of the cam shaft movement which is produced by the dog 112 as the tool head approaches the stop 155, the mechanism for timing the dwell period is set in operation. This mechanism includes a sleeve 161 having clutch teeth 162 thereon and rotatably supported in a bearing block 163 on the frame 89. The sleeve has worm teeth meshing with a worm 164 on a shaft 165 which is driven from the vertical shaft 76 through the medium of spiral gears 166 which can be changed to vary the speed at which the sleeve 161 rotates during operation of the feed motor 40.

Extending through the sleeve 161 is a rod 168 having loose thereon a disk 169 engaging a flange 169^a and carrying clutch teeth 170 urged toward the teeth 162 by a spring 171 acting between the sleeve and a nut 172 on the rod. A collar 173 surrounding the sleeve 161 is adapted for angular adjustment but is normally locked to the block 163 by a set screw 174. This collar has a recess extending parallel to the clutch axis and has a slidable plunger 175 which is urged toward the disk 169 by a compression spring 176 stronger than the spring 171. In the stopped position of the disk shown in Fig. 11, the plunger 175 engages a projection 177 on the disk so that the spring 176 holds the clutch disengaged. The projection is of sufficient radial length to engage the trip rod 180 as well as the plunger 175.

In the movement of the cam shaft 93 caused by the dog 112 as the tool head approaches the stop 155, a lobe 178 on a cam 179 carried by the cam shaft is moved into engagement with the end 183 of the rod 168 shifting the disk against the action of the spring 176 and causing engagement of the teeth 170 with the rotating teeth 162. The disk is thus rotated by the feed motor, engagement of the clutch being maintained by the spring 171. After turning through an angle determined by the starting position of the disk, the projection 177 engages the rod 180 and shifts the same to trip the latch 157. This releases the follower tails 156 permitting closure of the switches 94^a and initiating rapid return of the tool head to starting position in the manner previously described. However, the disk continues to rotate until, after the cam shaft 93 has been advanced by the dog 111 to render the cam lobe 178 ineffective, the projection 177 rides up on the inclined end of the plunger 175 which, owing to the strength of the spring 176, shifts the disk axially to release the clutch. The disk is thus stopped in a position which is determined by the angular position of the collar 173 and may be varied as desired to obtain different dwell periods.

When the spot facing control is not in use, the cam shaft 93 is shifted axially to move the cam 179 out of engaging relation with respect to the follower rod 168. Also the trip rod 180 is shifted to the right as viewed in Fig. 11 and held by a set screw 183 in a position such as to maintain the latch 181 ineffective in holding the follower tails 156.

The tool head actuating mechanism although described above in considerable detail, is typical of the various mechanisms which may be employed for rotating the tool spindle and feeding the head along the supporting guide rods. Obviously, other types of coacting feed elements, herein illustrated as the nut 67 and the screw 69 are contemplated as well as actuating mechanisms suited for actuation of the particular feed elements employed.

I claim as my invention:

1. A machine tool having, in combination, a tool head having at least one rotary spindle projecting therefrom for driving a tool to operate upon a work piece, a prime mover mounted on said head and having a driving connection extending to said spindle, there being a plurality of open ended parallel bores on said head extending parallel to the axes of said spindle and providing internal cylindrical way surfaces, a rigid box-like fixture frame having a base and upstanding side portions rigidly connected at their upper ends, said fixture being arranged to support said work piece in a position to be operated upon, means providing a cantilever mounting for supporting said tool head solely from said fixture frame comprising a plurality of elongated rods rigidly attached at one of their ends to said fixture frame and projecting in spaced parallel relation away from the frame with their axes spaced to coincide with the axes of said bores, the peripheral surfaces of said rods constituting cylindrical slideways snugly received in said bores, and means for reciprocating said tool head along said rods including power driven mechanism arranged to apply an actuating force to said head along a line disposed substantially in a plane including the axes of said rods.

2. A machine tool having, in combination, a tool head having at least one rotary spindle projecting therefrom for driving a tool to operate upon a work piece, a prime mover mounted on said head and having a driving connection extending to said spindle, there being a plurality of open ended parallel bores on said head extending parallel to the axes of said spindle and providing internal cylindrical way surfaces, a rigid box-like fixture frame having a base and upstanding side portions rigidly connected at their upper ends, said fixture being arranged to support said work piece in a position to be operated upon, means providing a cantilever mounting for supporting said tool head solely from said fixture frame comprising a plurality of elongated rods rigidly attached at one of their ends to said fixture frame and projecting in spaced parallel relation away from the frame with their axes spaced to coincide with the axes of said bores, the peripheral surfaces of said rods constituting cylindrical slideways snugly received in said bores and slidably supporting said head, and power actuated means for reciprocating said tool head along said rods.

3. A machine tool having, in combination, a tool head having at least one rotary spindle projecting therefrom for driving a tool to operate upon a work piece, a prime mover mounted on said head and having a driving connection extending to said spindle, a plurality of internal way surfaces on said head extending parallel to the axes of said spindle, a rigid box-like fixture frame arranged to support said work piece in a position to be operated upon, means providing a cantilever mounting for supporting said tool head solely from said fixture frame comprising a plurality of elongated rods rigidly attached at one of their ends to said fixture frame and projecting in spaced parallel relation therefrom, the external surfaces of said rods constituting slideways mating with said way surfaces whereby to slidably support said head, and power actuated means for reciprocating said tool head along said rods.

4. A machine tool having, in combination, a tool head having at least one rotary spindle projecting therefrom for driving a tool to operate on a work piece, a plurality of internal way surfaces on said head extending parallel to the direction of feed of the spindle, a support adapted to rest upon the floor and providing a heavy rigid fixture frame for supporting and holding a work piece in elevated position to be operated upon, a plurality of rods rigidly attached at one of their ends to said fixture frame and projecting in spaced parallel relation therefrom, the external surfaces of said rods constituting slideways mating with and enclosed by said way surfaces so that said head is primarily supported from said fixture frame through the medium of said rods during active engagement of the tool and work piece, relatively movable coacting feed elements having their axes extending parallel to and disposed substantially in the plane of said rods, one of said elements being rigidly mounted relative to said rods and the other element being mounted on the head to travel therewith, a prime mover on said head for rotating said spindle, and power actuated means for operating the movable feed element to move said head along said rods.

5. A machine tool having, in combination, a tool head having at least one rotary spindle projecting therefrom for driving a tool to operate on a work piece, a plurality of internal way surfaces on said head extending parallel to the direction of feed of the spindle, a support adapted to rest upon the floor and providing a heavy rigid fixture frame for supporting a work piece in elevated position to be operated upon, a plurality of rods rigidly attached at one of their ends to said fixture frame and projecting in spaced parallel relation therefrom, the external surfaces of said rods constituting slideways mating with and enclosed by said way surfaces so that said head is primarily supported from said fixture frame through the medium of said rods during active engagement of the tool and work piece, relatively movable coacting feed elements having their axes extending parallel to and disposed substantially in the plane of said rods, one of said elements being rigidly connected to said fixture frame adjacent the point of attachment of said rods thereto, and a prime mover carried by and movable with said head and having connections for transmitting power to said spindle for rotating the latter and also to said movable feed element to cause movement of said head along said rods.

ALEXANDER OBERHOFFKEN.